Feb. 23, 1954

R. BAADER 2,669,746

APPARATUS FOR CUTTING FISH

Filed Aug. 19, 1950

Inventor
RUDOLF BAADER

By Richards & Geier
Attorneys

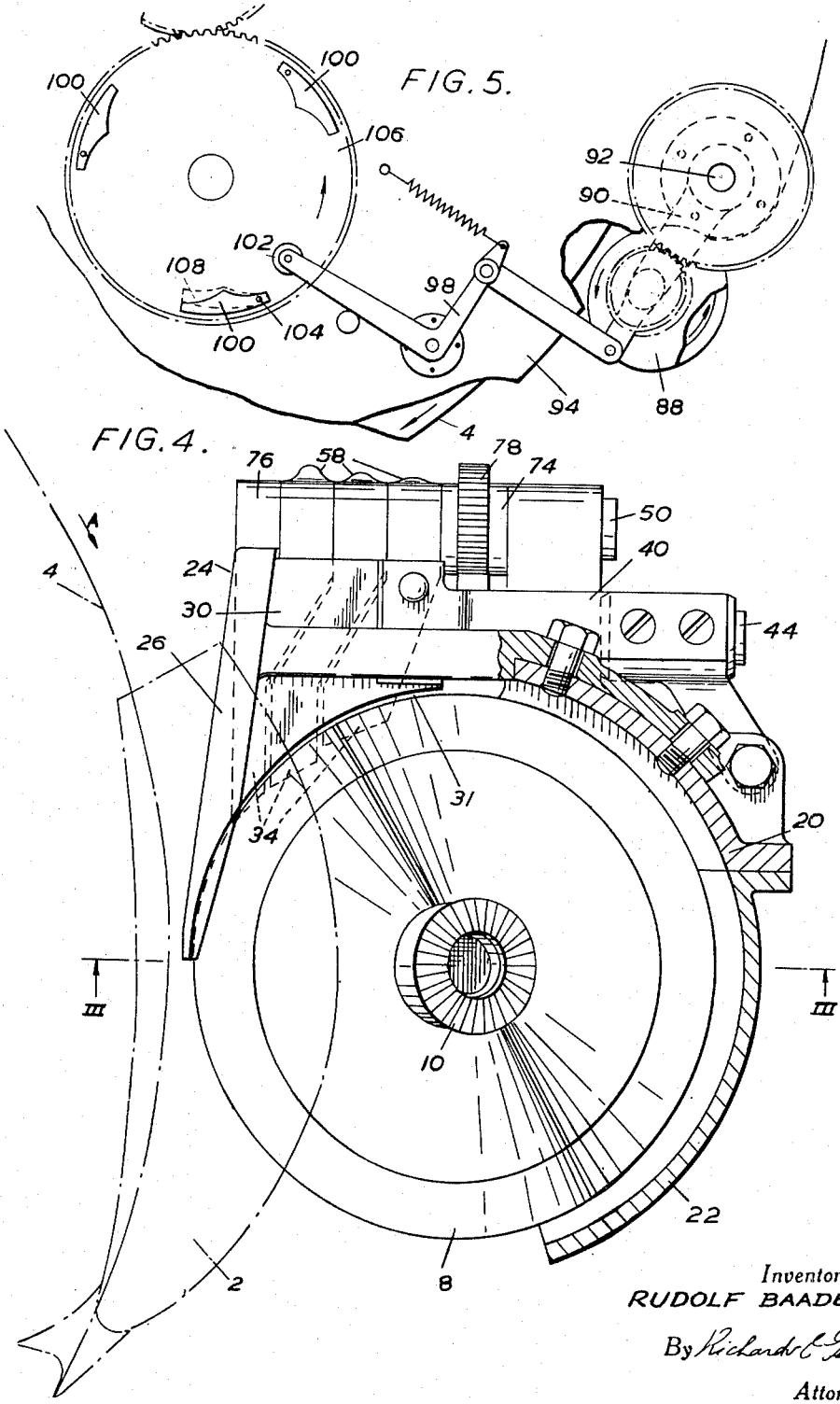

Patented Feb. 23, 1954

2,669,746

UNITED STATES PATENT OFFICE 2,669,746

APPARATUS FOR CUTTING FISH

Rudolf Baader, Lubeck, Germany

Application August 19, 1950, Serial No. 180,377

6 Claims. (Cl. 17—4)

The present invention relates to an improved process of dressing fish for human consumption and to apparatus for carrying out the process.

In the preparation of herrings and other fish for human consumption very thin slices or fillets are sometimes required. In preparing thick fish for pickling it is sometimes necessary to make cuts in the fish to enable the pickling liquid to penetrate the whole of the flesh.

It is an object of this invention to provide a process whereby cuts are made mechanically in fish to sever thin slices from the remainder.

It is a further object of this invention to provide a process whereby thin slices are severed from the inner surfaces of the belly walls of fish so as to remove the ribs.

It is a further object of this invention to provide a process whereby blind cuts are made in fish so as to assist the penetration of the liquid.

It is a still further object of this invention to provide apparatus in which fish are directed to a rotary disc knife so that cuts are made parallel to one surface of the fish.

In carrying out the invention in accordance with these objects the fish is carried past a flat guide and one surface of it is urged into contact with this guide by one or more resilient members. A rotary disc knife turns in a plane substantially parallel to the flat guide and makes a cut through the travelling fish. If the path of the fish is such that the whole of the width of the fish is engaged by the knife, a slice or fillet as thick as the distance by which the knife is offset from the flat guide will be removed. This distance can be adjusted by moving either the guide or the knife, and it can be made very small. If the knife does not extend wholly across the travelling fish, a blind cut will be made without any slice being completely severed.

The knife and the flat guide need not and preferably do not overlap in the direction of the fish, but rather the fish may be engaged by the knife just as it leaves the guide. With this arrangement a slice or fillet will readily fall completely away as the last part of the fish leaves the guide, the main body of the fish passing to one side of the edge of the knife and the slice or fillet to the other.

The invention is particularly useful in dressing the walls of the belly cavity of a herring. In a machine designed to dress herrings in this way there are two knives arranged in V fashion each with a corresponding flat guide. The fish is opened out into V section and each inner wall of the belly is pressed against a flat guide. Then the knives cut away thin layers of flesh from the inner walls and so remove both the bones which surround the belly cavity and the black skin with which it is lined. These layers contain oil which may be subsequently extracted.

Further objects and advantages will be apparent from the following description of the preferred apparatus embodying the invention, reference being made to the accompanying drawings in which:

Figure 4 is a horizontal section in the plane IV—IV shown in Figure 3; and

Figure 5 is a diagrammatic plan of a cam mechanism by which the apparatus is controlled.

Figure 1:
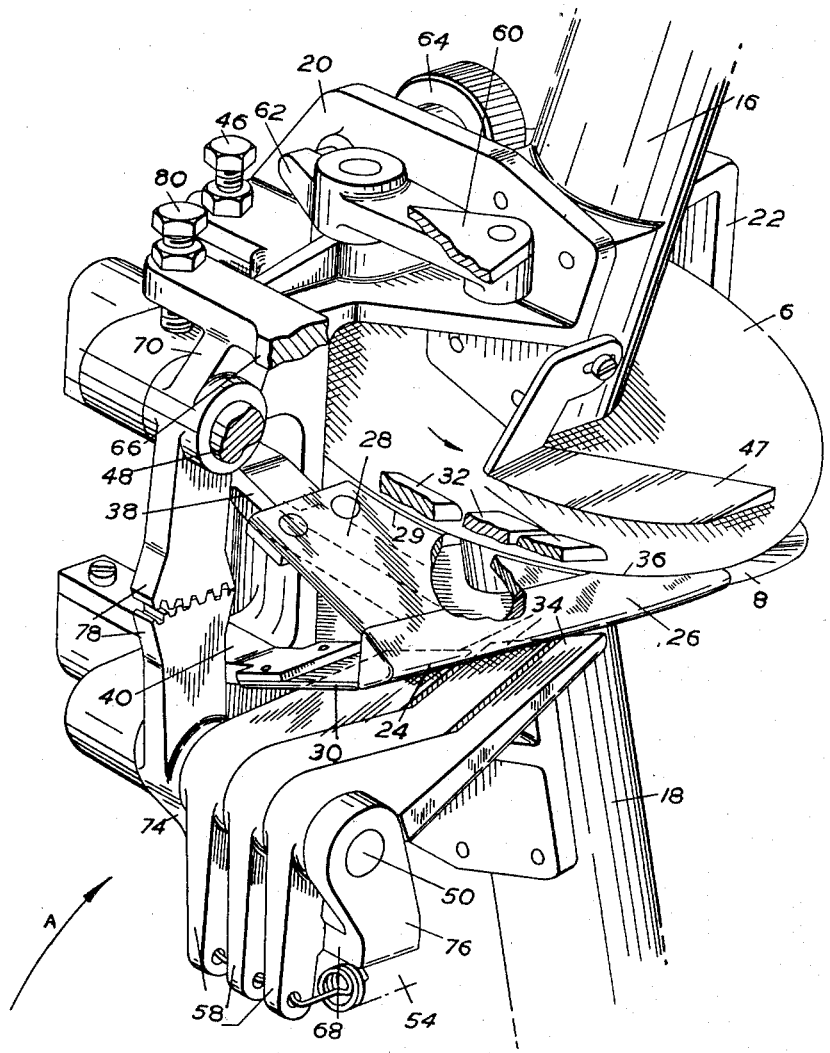
Figure 1 is a general perspective view.
Figure 2:
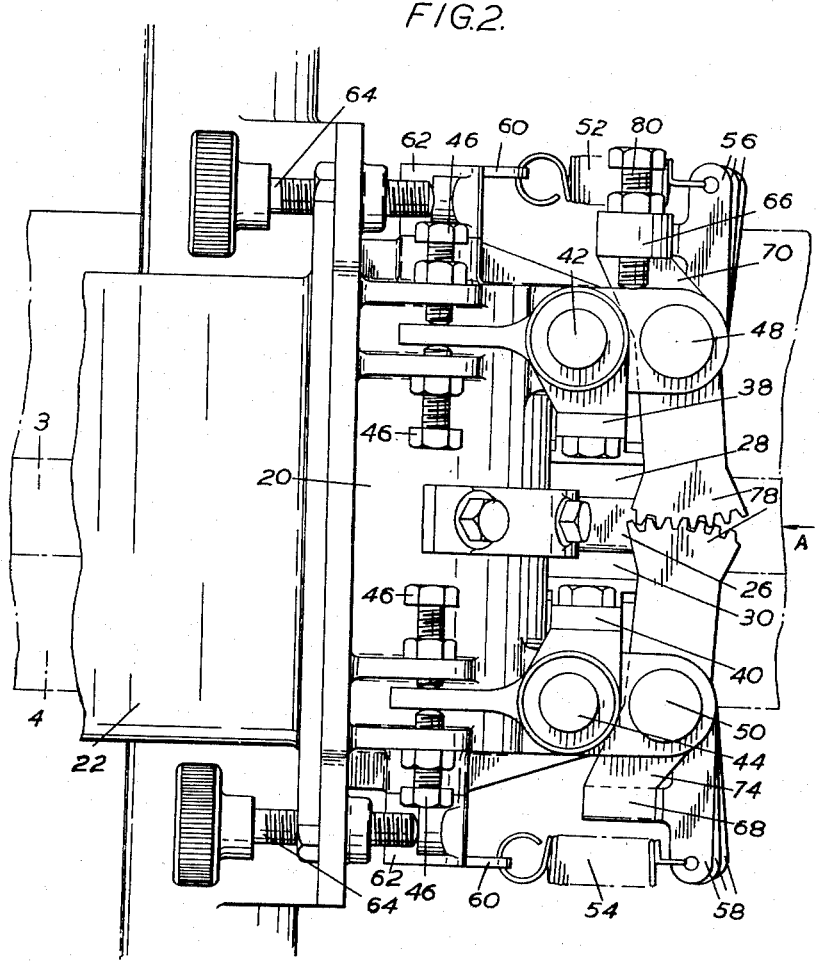
Figure 2 is a side elevation.
Figure 3:
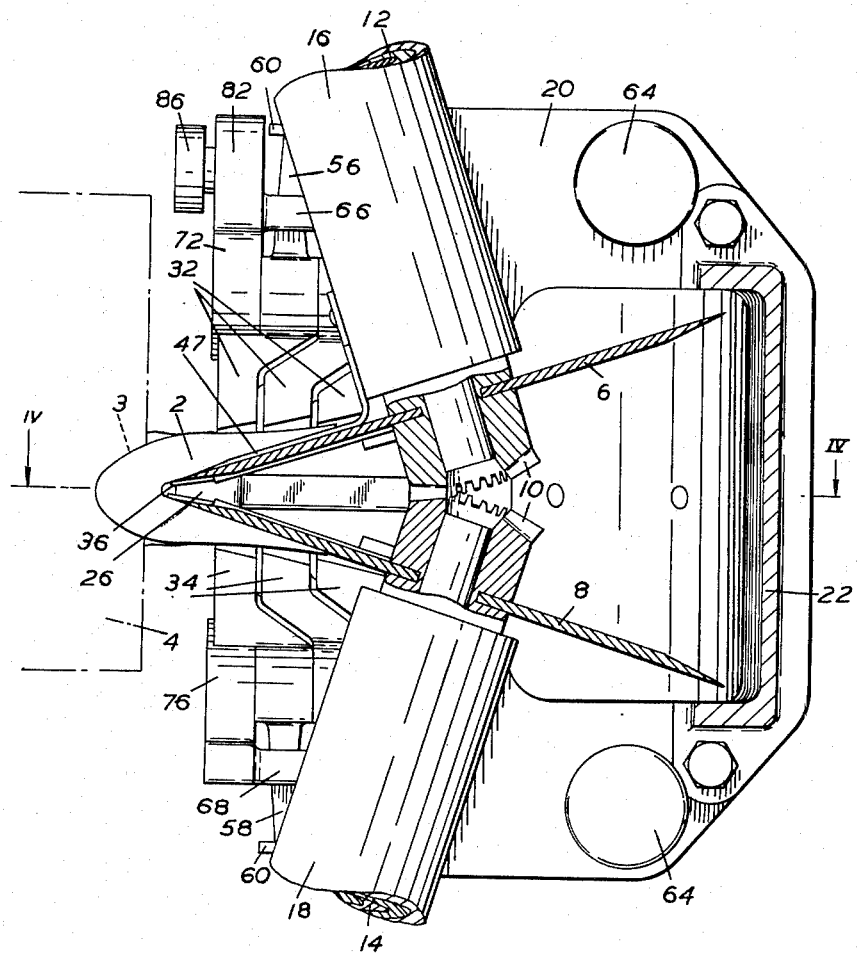
Figure 3 is a vertical section in the plane III—III shown in Figure 4.

The apparatus forms part of a complete machine in which herrings are dressed so as to become two fillets free of head, tail, guts or bones. The herrings are held with their backs in a groove in the surface of a drum which turns on a vertical axis and so carries the fish tail first past a series of tools of which the present apparatus is one. These tools are mounted on a fixed plate above the drum. In the figures a herring passing the apparatus is indicated at 2 and the surface of the drum at 4, with the groove 3 which receives the back of the herring.

The cuts which sever from the fish thin slices containing the rib bones are made by two rotary disc knives 6 and 8 geared together by bevel gears 10 and driven from above. The shafts 12 and 14 which carry these knives are journalled in bearings 16 and 18 secured to the main body or support means 20 of the apparatus. This body is of somewhat complex shape, and serves to carry the guides and resilient members which direct the fish to the knives, and also a guard 22 which partly surrounds the cutting edges.

The herrings, which approach the apparatus in the direction of the arrow A, are already split longitudinally and have had their heads and guts removed. As they reach the apparatus the rounded nose 24 of a central guide 26 enters the split and causes the fish to open until its belly cavity is V-shaped in section. This action is carried on by flat guides 28 and 30 which lie substantially parallel to the planes of the knives 6 and 8. Sets of fingers 32 and 34 bear on the outer surfaces of the belly walls of the fish and so press the inner surfaces against the flat guides and hold the fish to a definite shape as it approaches the cutting edges of the knives 6 and 8.

The fish are split beyond the line of the backbone, and hence to remove the ribs it is not necessary to cut away a slice as deep as the split. The guide 26 therefore is slightly thicker than the V formed by the knives 6 and 8 and is rabbetted at 36 to clear the cutting edges. Thus the slices are cut only from those parts of the belly walls which lie against the guides 28 and 30. These guides are carried by arms 38 and 40 which are pivoted to the body 20 at 42 and 44. The arms can be rotated slightly by screws 46 so as to vary the offset between the trailing edges 29 and 31 of the flat guides and the cutting edges of the knives, and thus the thickness of the slices. The upper half of the fish from which a slice has been cut is held clear of the knife 6 by a member 47.

The fingers 32 and 34 are pivoted independently on shafts 48 and 50 and are urged against the fish by springs 52 and 54 which act on tails 56 and 58. Each set of springs is connected to a triangular plate 60 which is pivoted on a lever 62 movable under the control of a screw 64 to vary the tension in the springs as may be required according to the hardness or softness of the fish.

The movement of the fingers 32 and 34 towards the surfaces of the knives 6 and 8 is limited by engagement of the tails 56 and 58 with two bars 66 and 68 which are pivoted by lugs 70, 72, 74 and 76 to the shafts 48 and 50. The lugs 70 and 74 are extended as interengaging gear sectors 78 which cause the two bars to move in unison. Movement of the bars is limited by a screw 80 which is adjusted so that at the extremity of their movement the fingers 32 and 34 do not quite touch the knives 6 and 8. The bar 66 also carries an arm 82 on the end of which is a roller 86 which engages with a cam surface (not shown) on the drum 4. This surface is so shaped that just as a fish is approaching the apparatus the roller 86 is lifted and so the fingers 32 and 34 are for a short time moved away from the guides 28 and 30 to allow the belly walls to enter freely between the guides and the fingers. Once the belly walls are between the guides and the fingers, the roller 86 is allowed to drop and the springs 52 and 54 urge the fingers against the belly walls.

In a particular catch, herrings may vary in length between about 8 and 15 inches and correspondingly in depth and thickness. As a result the line of the backbone of different fish will lie at different distances from the surface of the drum, and will in any case be a curve which is not concentric with the drum. In order to make cuts which both remove all the rib bones and do not remove excessive flesh, provision may be made to shift the apparatus bodily to and from the drum to an extent determined by the size of the fish. This is illustrated diagrammatically in Figure 5.

The apparatus indicated generally at 88 is carried on an arm 90 which can swing about a vertical pivot 92 on the plate 94 which is fixed above the drum 96. The swinging is controlled through a linkage 98 by a number of cams 100 and a follower 102. The cams 100 are pivoted at 104 to a rotating wheel 106 and are moved, for example, to a position 108, according to the length of each fish. Mechanism for moving these cams is described and claimed in my copending application Serial No. 180,378.

While the apparatus described in detail is arranged in a machine in which fish travel on their sides in a horizontal circle, apparatus according to the invention may also be used in other types of fish-dressing machine, in which, for example, the fish travel in a vertical circle or in a straight line, and are arranged belly or back uppermost.

Throughout this specification the flat guides and rotary disc knives have been described as being in substantially parallel planes. It is possible for there to be a slight angle between these components, and in the apparatus described in detail it is adjustment of this angle which varies the offset between the guide and slice. However the angle should not be more than a few degrees, or fish will have to be sharply bent in passing from the guide to the knife and the offset between the guide and the curved edge of the knife will be non-uniform.

I claim:

1. In an apparatus for cutting fish, in combination, two rotary disk knives extending at an acute angle to each other, a central-V-shaped guide for the fish, said guide extending between said knives in the direction of movement of the fish substantially to the point of nearest contact, support means, said guide being operatively associated with said support means, and resilient fish-engaging means mounted on said support means and operatively associated with said knives.

2. An apparatus in accordance with claim 1, wherein said resilient means comprise two sets of fingers located on opposite sides of said guide, each of said fingers being resiliently mounted.

3. In an apparatus for cutting fish, in combination, two rotary disk knives extending at an acute angle to each other, a central V-shaped guide for the fish, said guide extending between said knives and the surfaces of said guide extending substantially in the planes of said knives, support means, said guide being operatively associated with said support means, and fish-engaging fingers resiliently mounted on said support means on opposite sides of the fish being cut and pressing the fish against the surfaces of the V-shaped guide.

4. An apparatus in accordance with claim 3, wherein said central V-shaped guide has a rounded apex.

5. An apparatus in accordance with claim 3 further comprising means connected with said knives and said guide for adjusting the offset between said knives and the edge of said guide nearest thereto.

6. An apparatus in accordance with claim 5, wherein said adjusting means include means rocking the surfaces of the V-shaped guide.

RUDOLF BAADER.

References Cited in the file of this patent

UNITED STATES PATENTS

| Number | Name | Date |
|---|---|---|
| 2,140,575 | David et al. | Dec. 20, 1938 |
| 2,180,303 | Baader | Nov. 14, 1939 |
| 2,321,086 | Hutton | June 8, 1943 |
| 2,518,772 | Grausgruber | Aug. 15, 1950 |
| 2,601,292 | Hube | June 24, 1952 |

FOREIGN PATENTS

| Number | Country | Date |
|---|---|---|
| 114,334 | Australia | Apr. 2, 1941 |